US008162575B2

(12) United States Patent
Knurr

(10) Patent No.: US 8,162,575 B2
(45) Date of Patent: Apr. 24, 2012

(54) TRANSPORT AND ASSEMBLY VEHICLE FOR A COMPONENT MODULE

(75) Inventor: Frank Knurr, Herzebrock-Clarholz (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 352 days.

(21) Appl. No.: 12/505,672

(22) Filed: Jul. 20, 2009

(65) Prior Publication Data

US 2010/0021256 A1 Jan. 28, 2010

(30) Foreign Application Priority Data

Jul. 23, 2008 (DE) ......................... 10 2008 047 779

(51) Int. Cl.
*B60P 7/08* (2006.01)

(52) U.S. Cl. ........................................................ 410/47

(58) Field of Classification Search .................... 410/44, 410/47, 32, 35, 36, 42, 43, 46, 48; 269/289 R; 280/406.1, 765.1, 766.1; 414/589, 495; 187/244; 248/544, 671, 678, 554, 670

See application file for complete search history.

(56) References Cited

U.S. PATENT DOCUMENTS 4,660,796 A 4/1987 Garrec
7,377,733 B2 * 5/2008 Wright et al. .................. 410/49

FOREIGN PATENT DOCUMENTS

DE 20 2004 015 422 1/2005
EP 0 147 246 7/1985

* cited by examiner

*Primary Examiner* — Stephen Gordon
(74) *Attorney, Agent, or Firm* — Michael J. Striker

(57) ABSTRACT

A transport and assembly vehicle for a component module such as an aircraft engine includes a mobile platform which includes support arm structures on which the component module is situated during conveyance and while maintenance work is performed, and which are movable relative to the platform in such a manner that they may assume at least two positions, namely an active position in which they hold the component module, and an inactive position in which they release the component module; the support arm structures of the movable platform include receiving adapters, and the receiving adapters are situated in such a manner that their position is changeable in the longitudinal and transverse directions of the movable platform, so that the transport and assembly vehicle may be used to transport component modules of highly diverse sizes.

17 Claims, 3 Drawing Sheets

TRANSPORT AND ASSEMBLY VEHICLE FOR A COMPONENT MODULE

CROSS-REFERENCE TO RELATED APPLICATION

The invention described and claimed hereinbelow is also described in German Patent Application DE 10 2008 047 779.6 filed on Sep. 17, 2008. This German Patent Application, whose subject matter is incorporated here by reference, provides the basis for a claim of priority of invention under 35 U.S.C. 119(a)-(d).

BACKGROUND OF THE INVENTION

The present invention relates to a transport and assembly vehicle for a component module such as an aircraft engine.

EP 0 147 246 B1 made known a generic transport framework for aircraft engines, which includes a multiple-component platform structure. In the embodiment described therein, the platform structure includes a base and a frame structure which is detachably connected to the base, the frame structure including the retaining elements for accommodating the aircraft engine. Given that the base and the frame structure are detachably connected to one another, the frame structure may be equipped with bases having different dimensions, thereby enabling the transport framework to be used to transport engines of different sizes. The disadvantage of designs of this type is that a separate base for the transport framework must be provided for every type of engine. This greatly increases the costs to use a transport framework of this type in a flexible manner.

Furthermore, it is known from the prior art to design transport frameworks for aircraft engines to be displaceable. Reference is made in this case, e.g. to DE 20 2004 015 422 U1 which discloses a displaceable transport framework for conveying aircraft engines. Given that the undercarriage of the transport framework accommodates Mecanum wheels, it is possible to move the transport framework fully freely on a flat surface. This has the advantage in particular that the transport framework may react in a highly flexible manner to the spacial conditions that exist where aircraft engines are assembled and disassembled, independent of the design of the undercarriage, the use of a transport framework of this type depends, in turn, on the possibilities for securing the aircraft engines to be conveyed.

SUMMARY OF THE INVENTION

The object of the present invention, therefore, is to avoid the disadvantages of the related art described above and, in particular, to provide a transport and assembly vehicle for component modules such as aircraft engines, which may be adapted rapidly and cost-effectively to the geometries of various component modules to be transported by the transport and assembly module.

In keeping with these objects and with others which will become apparent hereinafter, one feature of the present invention resides, briefly stated, in a transport and assembly vehicle for a component module, comprising a mobile platform including support arm structures on which the component module is situatable during conveyance and while maintenance work is performed, said support arm structures being movable relative to said platform in such a manner that they assume at least two positions including an active position in which said support arm structures hold the component module and an inactive position in which said support arm structures release the component module, said support arm structures on said movable platform including receiving adapters situated in such a manner that their position is changeable in longitudinal and transverse directions of said movable platform.

Given that the transport and assembly vehicle for a component module such as an aircraft engine includes a movable platform having holding arms on which the component module is accommodated during conveyance and while maintenance work is performed, and given that the holding arms of the movable platform include receiving adapters which are situated in such a manner that their position is changeable in the longitudinal and transverse directions of the movable platform, a design is attained in which the transport and assembly vehicle has universal use since the fixing mechanism may be adapted rapidly and cost-effectively to the geometries of different component modules to be transported using the transport and assembly vehicle.

In an advantageous embodiment of the present invention, the movable platform includes at least two diametrically opposed platform segments; at least one component module may be situated in the intermediate space between these platform segments. As an alternative, the component module may likewise be placed directly on the platform segments and secured thereto. Designs of this type have the advantage that the component module may be accommodated by the receiving adapters of the transport and assembly vehicle using the appropriate force, and that the components are no longer overdimensioned.

Flexibility in transporting highly diverse types of component modules such as different types of aircraft engines and undercarriages is also increased further when, according to an advantageous development of the present invention, one or more receiving adapters is/are assigned to each platform segment, and the receiving adapters of each platform segment are situated in the same vertical position or in different vertical positions.

Given that diametrically opposed platform modules may be moved toward one another or away from each other, a design for realizing the transverse motion of the receiving adapters is attained that saves installation space, thereby ensuring that the transport and assembly vehicle has a compact design in the working- and transport position or when accommodating component modules directly on the platform segments, since the platform segments may be positioned directly next to one another.

Flexibility of use of the transport and assembly vehicle—according to the present invention—for component modules having highly diverse dimensions is increased further when the receiving adapters of a platform segment are situated on the particular platform segment in such a manner that they may be displaced horizontally and/or vertically.

In an advantageous development of the present invention, the component module is accommodated by a transport frame which includes fixing pockets in the movable platform for fixation. This has the advantage in particular that the component module may be positioned in a highly precise position in the transport and assembly vehicle, this position being retained even while the transport and assembly vehicle is being moved.

Given that, in an advantageous embodiment of the present invention, the fixing pockets are situated on the transport frame in such a manner that the receiving adapters of the movable platform segments may move toward them and engage in them, the preconditions are created for ensuring that the particular component module may be placed on or removed from the transport and assembly vehicle rapidly and safely.

To ensure that the component module is always securely fixed in the transport and assembly vehicle while the transport and assembly vehicle is being moved and while the component module is being swiveled, it is provided in a further advantageous embodiment of the present invention that the receiving adapters may be locked in the fixing pockets.

It is possible to change the position of the component module in the vertical direction in a manner that has been proven repeatedly in technical applications, and that is therefore highly reliable and precise, by integrating the movable platform in a transport and assembly vehicle using a lifting system. In this context, it is advantageous when, in the case of divided platforms, a lifting system is assigned to each platform segment, and each platform segment may be displaced separately in the vertical direction, or all movable platform segments may be displaced jointly in the vertical direction using the lifting system.

In an advantageous embodiment of the present invention, the lifting system is designed as a scissors lift, it being possible to displace the scissors lift hydraulically or by using a spindle-electric motor combination. Systems of this type have the advantage in particular that they make it possible to change the vertical position of the component module in a highly precise manner, and in very small increments or in a stepless manner.

In an advantageous embodiment of the present invention, it is made possible to move the transport and assembly vehicle and, therefore, the component module accommodated thereon, across the floor by the fact that the undercarriage of the transport and assembly vehicle includes Mecanum wheels which allow fully free movement of the transport and assembly vehicle on the floor as well as highly precise changes in direction. Since the Mecanum wheels must be controlled in a highly precise manner, it is advantageous for the undercarriage of the transport and assembly vehicle to be electrically driven.

Since, in aircraft manufacturing at the least, the assembly and disassembly of aircraft engines takes place at high heights, it is advantageous for the platform segments to include step surfaces and tool storage spaces so that the assembly teams may carry all of the necessary tools and instruments along with the moving platform. This saves assembly or disassembly time in particular, since the time spent to obtain tools is reduced to a minimum. Moreover, large assembly teams may perform several assembly and disassembly activities simultaneously.

In a further advantageous embodiment of the present invention, the receiving adapters are accommodated by support arm structures which are hingedly connected via a ball joint to the height-adjustable platform or its platform segments. A design of this type has the advantage in particular that the receiving adapters may move fully freely in space, thereby making it possible for the receiving adapters to easily access fixing pockets that are situated in critical positions. In this context it is also advantageous for the ball joints to be lockable in defined angular positions, thereby enabling the component module mounted on the receiving adapters to assume any position in space.

To prevent damage from occurring to the machine system and the component module during assembly or disassembly of a component module, it is provided in a further advantageous embodiment of the present invention that, on the transport frame of the component module and/or on the component module and/or on the height-adjustable platform and/or the height-adjustable platform segment, a sensor system for ascertaining the loads or the contact pressure of the component module is adapted to the machine system on which the component module is accommodated.

Further advantageous embodiments are the subject matter of further dependent claims and are described below with reference to exemplary embodiments shown in a plurality of figures.

DESCRIPTION OF THE PREFERRED EMBODIMENTS

Figure 1:
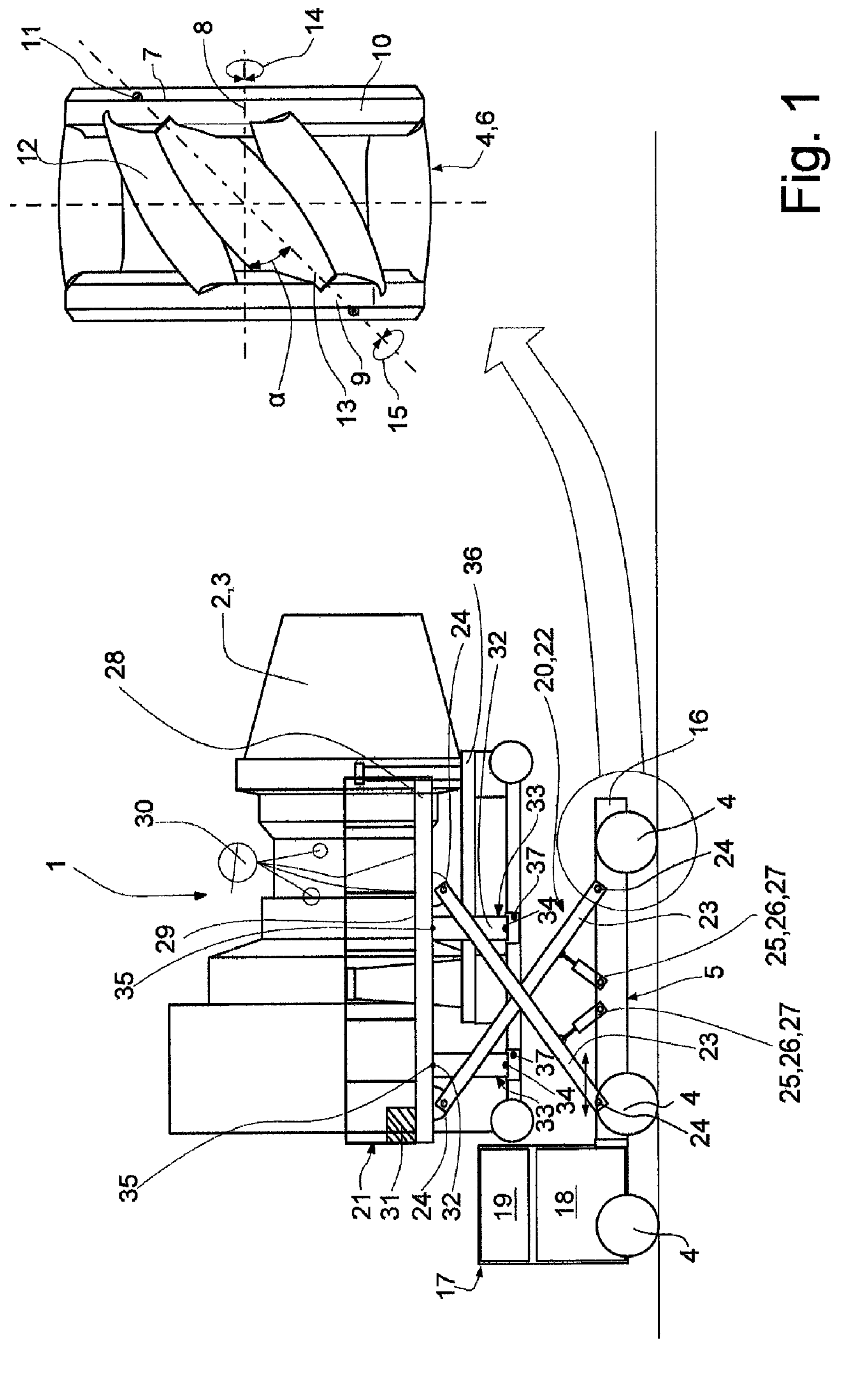
FIG. 1 shows the transport and assembly vehicle according to the present invention, in a side view

FIG. 1 shows, in a schematic view, a transport and assembly vehicle 1 for conveying component modules 2 such as aircraft engines 3. Transport and assembly vehicle 1 includes an undercarriage 5 which accommodates a large number of land wheels 4. As shown in the enlarged view in FIG. 1, land wheels 4 are designed as Mecanum wheels 6. Wheel body 7 of land wheels 4 of this type includes land wheel axle 8—which is indicated using dashed lines—and adjacent support elements 9, 10 which bound the land wheel width on both sides and are non-rotatably connected to land wheel axle 8. Openings 11 which are situated on a common peripheral circle extend through support elements 9, 10 at regular intervals. Openings 11 accommodate bearing seats (not depicted) which support rolling bodies 12 which are assigned to the circumferential surface of land wheel 4.

Rolling bodies 12 are accommodated in a freely rotatable manner by support elements 9, 10. Axis of rotation 13 of each rolling body 12 is positioned at an angle to land wheel axle 8 of particular land wheel 4. The slanted position of rolling bodies 12 is due to angle □ between land wheel axle 8 and particular axis of rotation 13, as viewed from the front. Given that land wheel 4 can rotate around its own land wheel axle 8 in the clockwise and counterclockwise directions as indicated by arrow direction 14, and given that each rolling body 12 can likewise rotate around its axis of rotation 13 in the clockwise or counterclockwise direction as indicated by arrow direction 15, a transport and assembly vehicle 1 provided with land wheels 4 of this type is provided with the capability—in a manner known per se—of performing very precise motions in highly diverse directions of motion.

Undercarriage 5 is accommodated by a support frame structure 16 which includes a system module 17 in an end-side region. System module 17 includes one or more batteries 18 for supplying energy to the electrical drive (not depicted) of land wheels 4. Furthermore, system module 17 includes a control unit 19 which controls all of the motions—to be described in greater detail below—of transport and assembly vehicle 1 and its elements, the positions of which are changeable; the elements are described in greater detail below. A lifting system 20 is assigned to support frame structure 16 on the top side.

Lifting system 20 accommodates platform 21 according to the present invention on its top-side free end. In the embodiment shown, lifting system 20 is designed as a scissors lift 22, support beams 23 of which are provided in pairs and cross one another, may pivot around horizontal axes 24 at their free ends at the top and bottom, and are pivotably attached to support frame structure 16 which accommodates undercarriage 5; the lower end—which is assigned to system module 17—of related support beam 23 is situated in a horizontal guide rail (not depicted) in a displaceable manner in order to compensate for changes in length. In addition, each support beam 23 is guided separately, or a large number of support beams 23 is guided jointly via a position-changing drive 25 which is accommodated by support frame structure 16 in a pivoting manner; position-changing drive 25 enables scissors lift 22 to extend and retract, thereby changing the position of movable platform 21 in the vertical direction. To implement the vertical change in position, position-changing drive 25 described in the present embodiment includes one or more reciprocating cylinders 26 to which pressure may be applied hydraulically or pneumatically. It is also feasible, however, for reciprocating cylinder(s) 26 to be replaced by one or more spindle-electric motor systems 27, which are not shown and which are known per se.

To ensure that transport and assembly vehicle 1 may lift component module 2 designed as aircraft engine 3 using the appropriate force, one lifting system 20 designed as a scissors lift 22 and having separate position-changing drives 25 and separate platform segments 28 is assigned to each of the two sides of support frame structure 16 transversely to the longitudinal axis of transport and assembly vehicle 1. In this manner, it is made possible to guide platform segments 28 in the vertical direction independently of one another. It is also feasible, however, to couple position-changing drives 25 and/or lifting systems 20 of movable platform segments 28 to one another in such a manner that platform segments 28 may change their positions in a synchronized manner. Movable platform 21 or each platform segment 28 includes a step surface 29 on which assembly personnel 30 may move in order to assemble and disassemble a component module 2 accommodated by transport and assembly vehicle 1. In addition, tool storage spaces 31 which are not presented in greater detail are assigned to platforms 21, 28.

In the embodiment shown, two interspaced support arm structures 32 situated in a region underneath step surface 29 are assigned to movable platform 21 and movable platform segments 28. Support arm structures 32 accommodate, on their free lower ends 33, receiving adapters 34 which point in the direction of component module 2 which is situated between platform segments 28. To simplify the assembly, disassembly and transport of a component module 2, it is also possible to design support arm structures 32 which accommodate receiving adapters 34 to be telescopable, thereby making it possible to fine-tune the vertical positioning of receiving adapters 34 even while the position of platform segments 28 remains unchanged. In this context, it is also feasible for support arm structures 32 to be accommodated by particular platform segment 28 via ball joint mechanisms 35. In this manner it is possible for each receiving adapter 34 to assume any position relative to platform segment 28. Given that ball segment mechanisms 35 may be locked in any position in a manner which is known per se and is therefore not described in greater detail, it is also possible to lock each ball joint mechanism 35 in a different position.

To ensure that particular component module 2 may be accommodated by receiving adapters 34 of transport and assembly vehicle 1 in a time-saving and secure manner, component modules 2 are fastened to transport frame 36. Fixing pockets 37 extend through each transport frame 36 in its side regions; fixing pockets 37 are positioned on transport frame 36 in such a manner that receiving adapter 34 (described above) of platform segments 28 of transport and assembly vehicle 1 may move toward them and engage in them.

Figure 2:
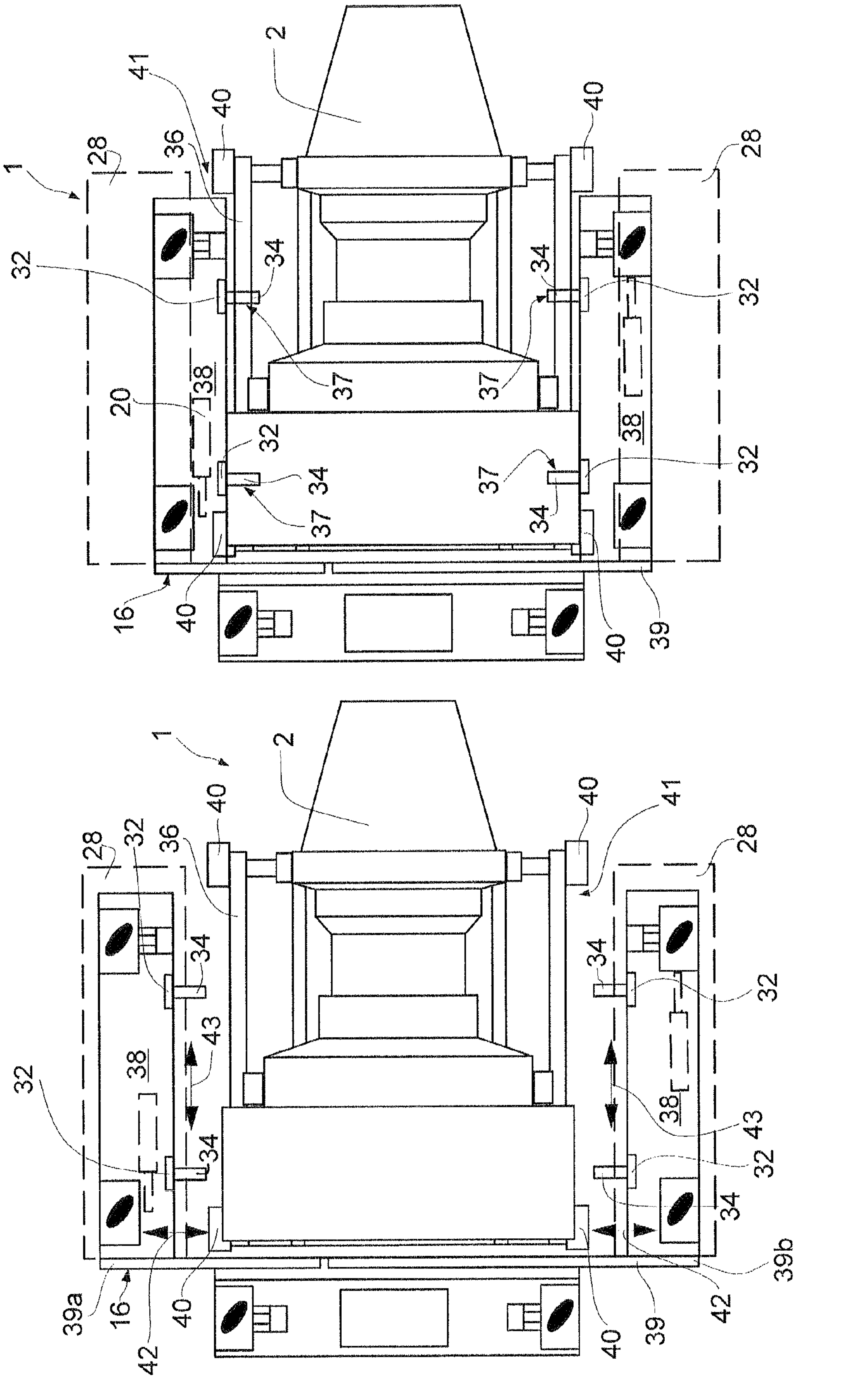
FIG. 2 shows the transport and assembly vehicle according to the present invention, in a top view

FIG. 2 is a schematic illustration of the procedure for locking a component module 2 in transport and assembly vehicle 1 according to the present invention. The illustration on the right in FIG. 2 shows the position in which transport frame 36 is supported by receiving adapter 34 of transport and assembly vehicle 1. Support frame structure 16 of transport and assembly vehicle 1 includes right and left undercarriage modules 38 which are connected to one another via a central frame 39. Installed on each undercarriage module 38 is a lifting system 20 and a platform segment 28 assigned to lifting system 20 on the top side. Given that transport frame 36 of component module 2 includes land wheels 40, and the region between platform segments 28 is open since they are two-pieced, component module 2 may be easily moved into intermediate space 41 between platform segments 28.

To fix transport frame 36 in place using receiving adapters 34 assigned to platform segments 28, particular platform segment 28 is moved in the direction of transport frame 36, as indicated by arrow direction 42. In a preferred embodiment, central frame elements 39*a, b* on the right and left sides which accommodate platform segments 28 are telescopable or displaceable jointly or independently of one another, e.g. using reciprocating cylinder systems, thereby enabling platform segments 28 of transport and assembly vehicle 1 to move toward one another or away from each other. At the same time or in succession, receiving adapters 34 are displaced relative to one another in the longitudinal direction of transport and assembly vehicle 1, as indicated by arrow direction 43, until receiving adapters 34 are positioned in the region of particular fixing pockets 37. The result is that, in the manner according to the present invention, receiving adapters 34 assigned to support arm structures 32 are situated on transport and assembly vehicle 1 such that their position is changeable in the longitudinal and transverse directions of component module 2, as indicated by arrow directions 42, 43. Given that receiving adapters 34 as shown in the embodiment in FIG. 1 include telescopable support arm structures 32, both of which may be situated on particular platform segment 28 using ball joint mechanisms 35, the possibility is created for moving each receiving adapter 34 in nearly any possible direction in space and positioning it in space in order to reach particular fixing pocket 37.

Given that each support arm structure 32 which accommodates a receiving adapter 34 is designed to be separately controllable, it is possible for receiving adapter 34 of a platform segment 28 or all receiving adapters 34 of transport and assembly vehicle 1 to be positioned in the same vertical position or in different vertical positions. Given that all of the possible changes in position described above may be implemented on the same transport and assembly vehicle 1, it is possible to situate receiving adapters 34 of each platform segment 28 on transport and assembly vehicle 1 in such a manner that they may be displaced and/or pivoted horizontally and/or vertically. To ensure that component module 2 may always be held and moved securely by receiving adapters 34 of transport and assembly vehicle 1, it may be provided that receiving adapters 34 are locked in fixing pockets 37 of transport frame 36. For this purpose, it is possible to provide manually operated or remote-controlled locking devices which are known per se and are therefore not described here.

Figure 3:
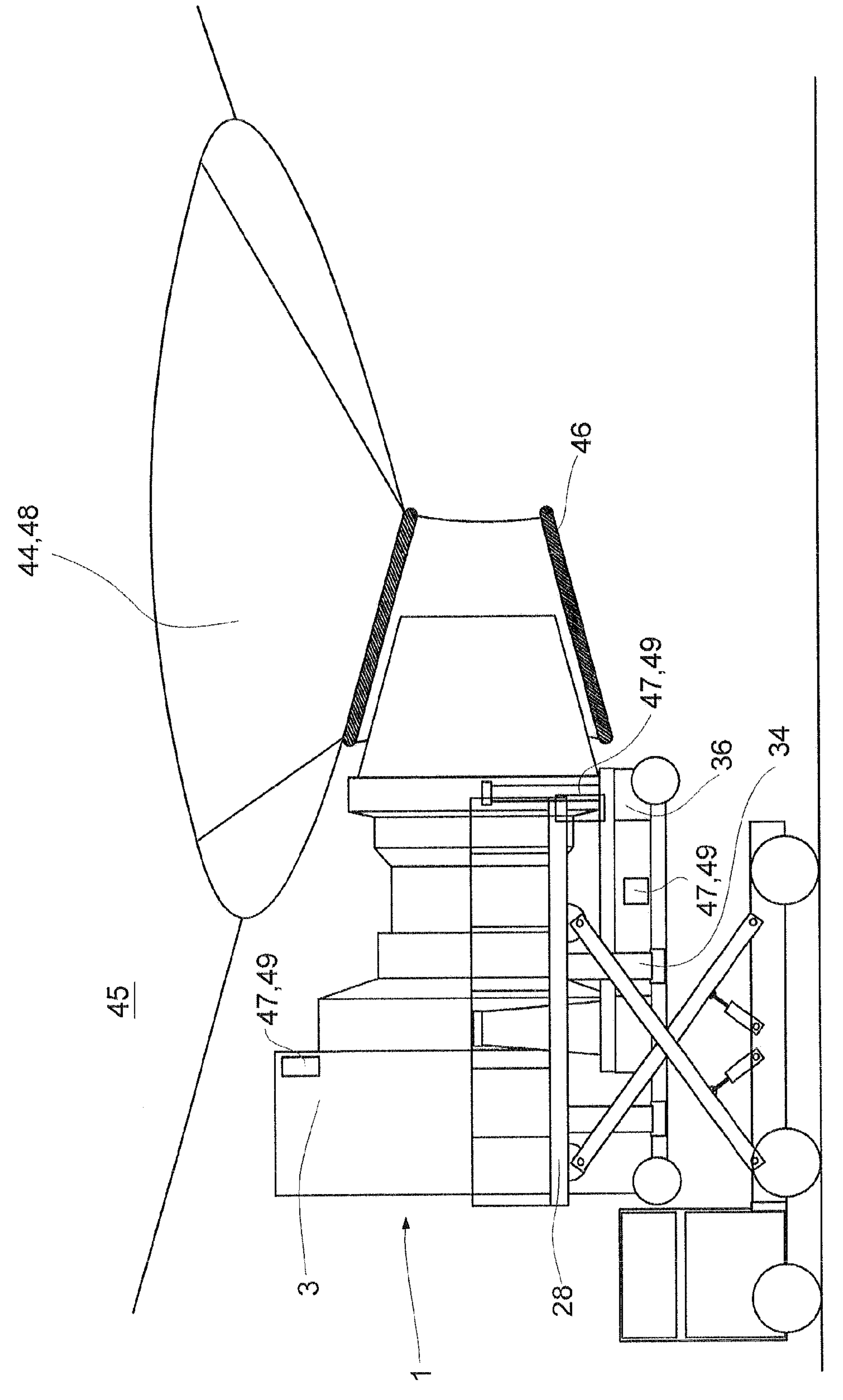
FIG. 3 shows the installation of an aircraft engine on the airfoil of an aircraft.

FIG. 3 is a schematic illustration of a newly manufactured or repaired aircraft engine 3 being installed on airfoil 44 of an aircraft 45. Aircraft engine 3 is fixed via its transport frame 36 and receiving adapters 34 according to the present invention to platform segments 28 of transport and assembly vehicle 1.

To ensure that aircraft engine 3 may be inserted gently into fastening receptacles 46 which are integrally formed in airfoil 44, it is also provided that a sensor system 47 is assigned to transport and assembly vehicle 1; sensor system 47 ascertains the contact pressure of component module 2 designed as an aircraft engine 3 on machine system 48 which accommodates component module 2, which is airfoil 44 of aircraft 45 in this case. Depending on the amount of installation space available, and depending on the level of measurement accuracy desired, one or more sensor systems 47 may be provided. Sensor systems 47 may be adapted on transport frame 36 of component module 2, and/or on component module 2, and/or on height-adjustable platform 21, and/or on height-adjustable platform segments 28.

It lies within the scope of the present invention for sensor systems 47 to include control devices 49 which stop the motion of aircraft engine 3—in a manner that is dependent on a threshold value—in the direction of fastening receptacles 46 of airfoil 44 as soon as the stored threshold value for a permissible contact pressure of component module 2 on machine system 48 has been reached or exceeded.

It will be understood that each of the elements described above, or two or more together, may also find a useful application in other types of constructions differing from the types described above.

While the invention has been illustrated and described as embodied in a transport and assembly vehicle for a component module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A transport and assembly vehicle for a component module, comprising an undercarriage comprising a support structure and configured with a plurality of Mecanum wheels;

a movable platform including support arm structures on which the component module is arranged or positioned during conveyance and while maintenance work is performed, wherein said support arm structures are movable relative to said movable platform and assume at least two positions including an active position in which said support arm structures hold the component module and an inactive position in which said support arm structures release the component module, wherein said support arm structures on said movable platform include receiving adapters configured to be changeable in position linearly relative to each other in longitudinal and transverse directions of said movable platform; and a lifting system arranged on the support structure, the lifting system comprising support beams and a position changing drive, wherein the support beams are pivotably attached to the support structure at one end, to said movable platform at another end and are extendable and retractable to change a vertical position of said movable platform by operation of the position changing drive.

2. The transport and assembly vehicle as defined in claim 1, wherein said movable platform includes at least two diametrically opposed platform segments and wherein the component module is arranged or positioned on said support arm structures in an intermediate space between said platform segments.

3. The transport and assembly vehicle as defined in claim 2, wherein said receiving adapters are assigned to said movable platform or to each of said diametrically opposed platform segments and arranged in a position selected from the group consisting of a same vertical position and different vertical positions.

4. The transport and assembly vehicle as defined in claim 2, wherein said diametrically opposed platform segments are movable toward one another and away from each other.

5. The transport and assembly vehicle as defined in claim 3, wherein in a case where said receiving adapters are assigned to said diametrically opposed platform segments, are situated in such a manner that said receiving adapters are arranged to be movable in a manner selected from the group consisting of displaced and swiveled in a direction selected from the group consisting of horizontally, vertically, and both horizontally and vertically.

6. The transport and assembly vehicle as defined in claim 1, further comprising a transport frame for accommodating the component module, said transport frame including fixing pockets in said movable platform for fixation.

7. The transport and assembly vehicle as defined in claim 6, wherein said movable platform includes at least two diametrically opposed platform segments and wherein said fixing pockets are situated on said transport frame in such a manner that said receiving adapters of said movable platform are movable toward the fixing pockets and engage in the fixing pockets.

8. The transport and assembly vehicle as defined in claim 7, wherein said receiving adapters are locked in said fixing pockets.

9. The transport and assembly vehicle as defined in claim 1, wherein said lifting system integrates said movable platform or at least two diametrically opposed movable platform segments in the transport and assembly vehicle.

10. The transport and assembly vehicle as defined in claim 9, wherein said movable platform segments are movable in a way selected from the group consisting of each said movable platform segments movable separately in a vertical direction and all said movable platform segments movable jointly in a vertical direction using said lifting system.

11. The transport and assembly vehicle as defined in claim 9, wherein said lifting system is assigned to each of said movable platform segments or said movable platform and is configured as a scissors lift.

12. The transport and assembly vehicle as defined in claim 11, wherein said scissors lift is movable either hydraulically or by use of a spindle-electric motor combination.

13. The transport and assembly vehicle as defined in claim 1, further comprising means for electrically driving the transport and assembly vehicle.

14. The transport and assembly vehicle as defined in claim 2, wherein at least said movable platform or each of said platform segments include a step surface and tool storage spaces.

15. The transport and assembly vehicle as defined in claim 3, wherein said receiving adapters are accommodated by said support arm structures, wherein said support arm structures are hingedly connected via ball joints to said movable platform or said diametrically opposed platform segments which said movable platform or platform segments are vertically displaceable.

16. The transport and assembly vehicle as defined in claim 15, wherein said ball joints are lockable in defined angular positions.

17. The transport and assembly vehicle as defined in claim 1, further comprising a sensor system for ascertaining loads or a contact pressure of the component module on a machine system which accommodates said component module and which is situated on an element selected from the group consisting of a transport frame of the component module, said movable platform which is vertically displaceable, at least two diametrically opposed platform segments which are vertically displaceable, and a combination thereof.

* * * * *